Dec. 25, 1956  D. L. RAYMOND ET AL  2,775,293
LIQUID FUEL FIRED HEATING APPARATUS FOR USE, ESPECIALLY
ON AUTOMOTIVE CONVEYANCES
Filed Sept. 16, 1952  4 Sheets-Sheet 1

INVENTORS
DAVID L. RAYMOND
BY RICHARD C. SPOONER

Brennan B. West
ATTORNEY

INVENTORS
DAVID L. RAYMOND
BY RICHARD C. SPOONER

ATTORNEY

Dec. 25, 1956 D. L. RAYMOND ET AL 2,775,293
LIQUID FUEL FIRED HEATING APPARATUS FOR USE, ESPECIALLY
ON AUTOMOTIVE CONVEYANCES
Filed Sept. 16, 1952 4 Sheets-Sheet 3

INVENTORS
DAVID L. RAYMOND
BY RICHARD C. SPOONER

ATTORNEY

Dec. 25, 1956  D. L. RAYMOND ET AL  2,775,293
LIQUID FUEL FIRED HEATING APPARATUS FOR USE, ESPECIALLY
ON AUTOMOTIVE CONVEYANCES
Filed Sept. 16, 1952  4 Sheets-Sheet 4

INVENTORS
DAVID L. RAYMOND
BY RICHARD C. SPOONER

ATTORNEY

United States Patent Office 2,775,293
Patented Dec. 25, 1956

2,775,293

LIQUID FUEL FIRED HEATING APPARATUS FOR USE, ESPECIALLY ON AUTOMOTIVE CONVEYANCES

David L. Raymond, Lyndhurst, and Richard C. Spooner, Fairview Park, Ohio, assignors, by mesne assignments, to Hupp Corporation, Detroit, Mich., a corporation of Virginia Application September 16, 1952, Serial No. 309,762

5 Claims. (Cl. 158—91)

This invention relates, generally, to heating apparatus fired by liquid hydrocarbon fuels, and more particularly to that class of such apparatus used on automotive conveyances for heating parts thereof, including the personnel compartment, engine, etc.

One object of our invention is to provide heating apparatus of the above mentioned class that will ignite readily and operates efficiently and reliably on the kind of fuel used in the engine of the conveyance, and that is unaffected by severe ambient conditions, such as extremely low temperatures, high winds, and the presence of rain, snow, ice or mud.

The importance of these advantages will be more readily appreciated when it is understood that our improved heater is especially intended for, but not limited to, use on trucks, and on construction and maintenance units that are sometimes subjected to the most unfavorable operating conditions, rough travel, and low ambient temperatures.

It is, therefore, another object of our invention to produce a heater that will start readily and function properly under sub zero temperatures, ranging as low as —70° F., for example, and that is of relatively simple, sturdy and durable construction, fitting it to the kind of service just mentioned.

A further object is the production of a liquid fuel burner, generally of the pot type, that is characterized by opposed sumps spaced apart axially of the pot and by a lateral sump, and that will, therefore, operate efficiently and satisfactorily in upright position, in inverted position, in a horizontal position with the lateral sump downward, or in any intermediate position, thus rendering the burner especially suitable for use in a heater of the class above mentioned.

A still further object is to provide means for spreading or diffusing the fuel as it enters the burner pot, thereby to enhance vaporization of the fuel during the ignition period as well as throughout the operating phase.

Other objects and advantages will appear as we proceed to describe the embodiment of our invention illustrated in the accompanying drawings, like parts being designated by like reference characters throughout the several views of the drawings.

As previously pointed out, the heater will operate satisfactorily in any of many positions, and we have shown it in the drawings as occupying a horizontal position.

Figure 1:
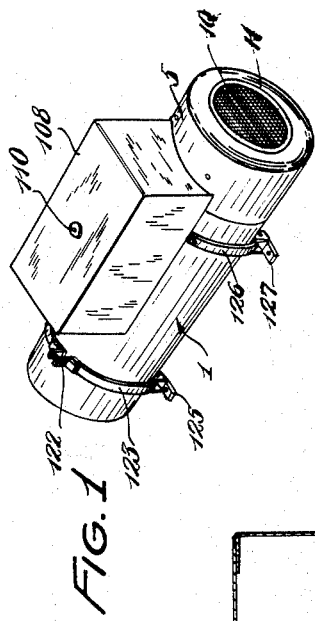
Fig. 1 is a perspective view of our improved heater, drawn to a small scale.

Such terms as "front," "rear," "top" and "bottom" are used herein without limiting intent and only because they are appropriate to the horizontal position in which the heater is illustrated in the drawings.

The casing 1 of the heater is desirably made from a rectangular piece of sheet metal formed into a cylinder having an overlapping joint along one side, in the present instance, the underside. Discarding for the moment the manner in which the casing is assembled about the other parts of the structure, it may be described as being open at both ends; and fitted into the rear end of the casing is a front portion of an air impeller unit assembly designated, generally, by the reference letter A. B designates, generally, a second or combustion unit assembly that occupies the casing 1 forwardly of the former assembly.

The first mentioned assembly includes a walled enclosure made up of a relatively short, cylindrical sheet metal casing 5 that is formed with an overlapping joint along its underside; an annular shell 6, the rear portion of which fits within and is secured as by welding to the forward end of the casing 5; and a rear end section 7, composed of a cylindrical wall 8 and a rear wall 9, said walls being shaped to interfit about the perimeter of the end wall where the two walls are welded or otherwise secured together. The rear wall has a central aperture 10 across which a screen 11 extends, said screen being suitably attached to the end wall. The front end of the section 7 is telescoped into the casing 5 a distance permitted by a circumferential bead 12, and the end section is held to the casing 5 by a plurality of bolts 13.

Figure 2:
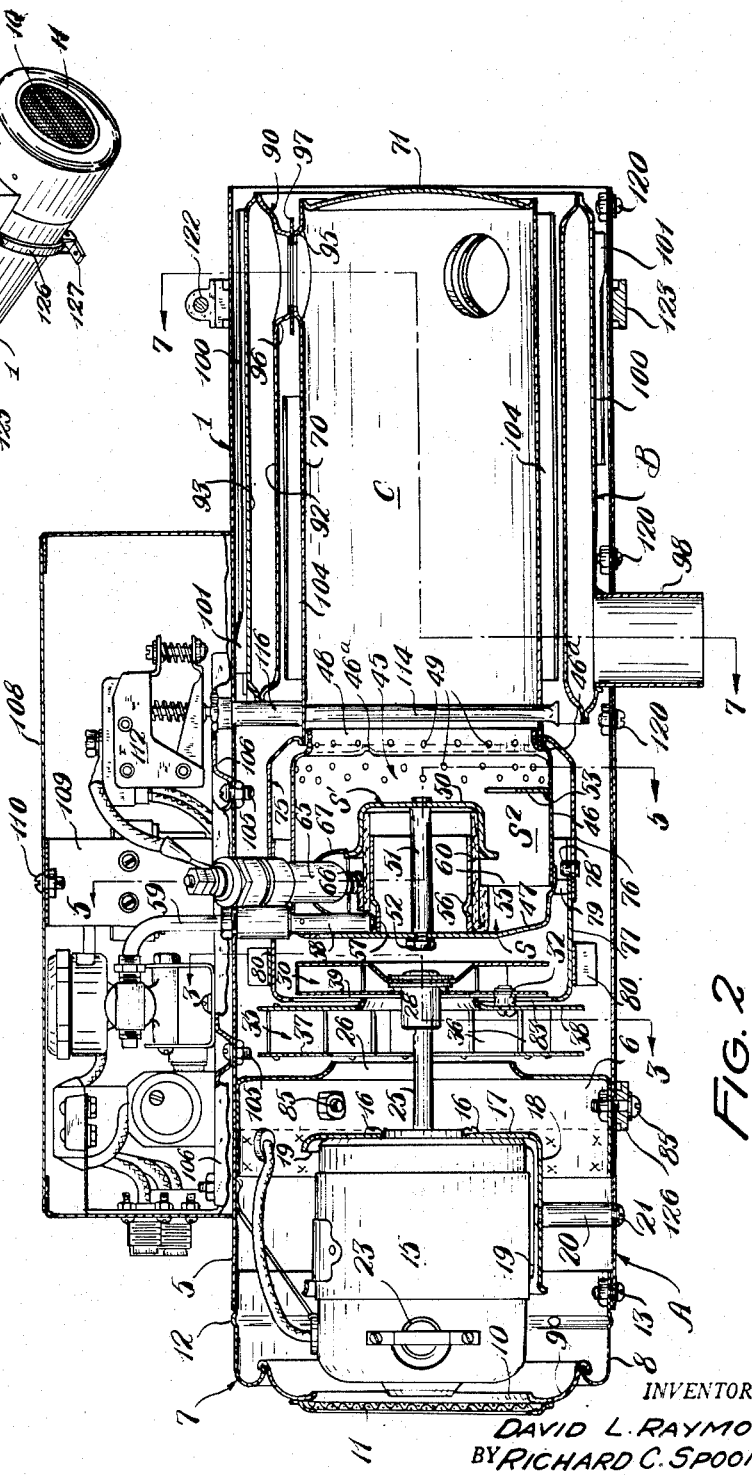
Fig. 2 is a central longitudinal section through the heater.

An electric motor 15 is secured, as by screws 16, to the annular end wall 17 of a motor support 18 that is preferably drawn to cup formation from sheet metal and the peripheral wall of which is provided with relatively large ventilating openings or slots 19. Arms 20 are secured at their inner ends to the peripheral wall of the motor support and radiate therefrom, and their outer ends, which are provided with threaded axial recesses, are secured to the casing 5 by screws 21 that are extended through apertures in the casing and are threadedly engaged within said recesses. Convenient access to the brushes of the motor, one of which is indicated at 23 in Fig. 2, for the purposes of adjustment and replacement, is afforded by the ready removability of the end section 7 of the walled enclosure. The shaft 25 of the motor projects forwardly through the relatively large central opening 26 of the annular shell 6, and mounted upon and suitably fastened to the forward end of the shaft is the hub 28 of a rotary or centrifugal fan 30, hereinafter referred to as the combustion air fan. Secured to and spaced from the rear side of the fan 30, by a suitable number of spacing and fastening means designated 32, is a considerably larger rotary or centrifugal fan 35, hereinafter referred to as the fresh air fan. It is evident from the foregoing description that the two fans are arranged in tandem, that they constitute parts of an air impelling means, and that they are driven in unison. The blades 36 of the fan 35 are supported by and between a rear ring-like plate 37 and an annular front plate 38, the former plate having an opening of substantially the same diameter as the previously mentioned opening 26, while the front plate 38 has an opening of approximately the same size as an opening in the rear ring-like plate 39 of the fan 30. Accordingly, all air moved by the impelling means comprised of the fans 30 and 35 is drawn in through the aperture 10, about the motor 15, and through the aperture 26. Since all atmospheric air entering the heater envelops the motor, the motor will be kept relatively cool during operation.

The burner, designated generally by the reference numeral 45, is of a modified pot-type, and the pot is composed of front and rear sections 46 and 47, respectively. These sections are preferably fabricated of sheet metal, and are secured together, as by welding, at their adjoining ends. The front section 46 is cylindrical and is reduced at its forward end to provide a neck 48 which, with the adjacent portion of the peripheral wall of the section, is provided with air admitting openings 49. The front section 46 at the base of the neck 48 is embossed or dimpled at points spaced apart circumferentially of the section to provide a plurality of projecting seats 46a for a purpose which will presently appear.

Figure 5:
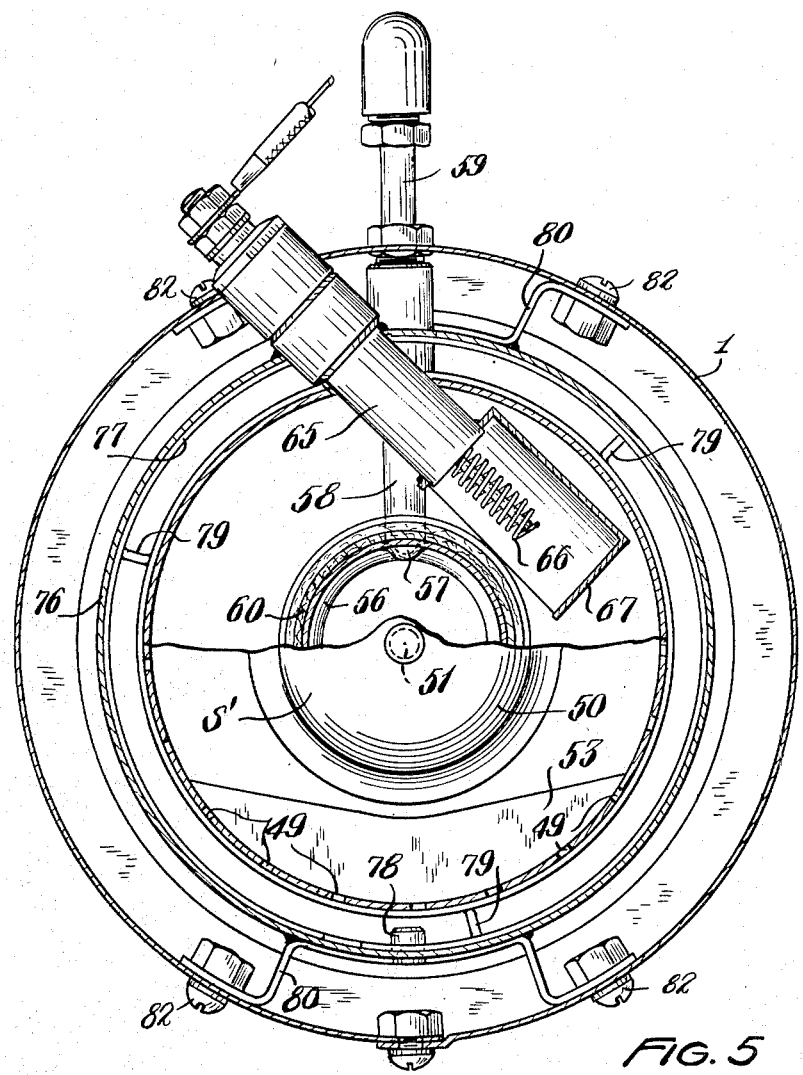
Fig. 5 is a transverse section on the line 5—5 of Fig. 2.

The conventional pot-type burner invariably occupies an upright position when in use, wherefore the fuel sump is confined to the bottom of the pot. However, since our improved heater is intended to operate, not only in a vertical upright position, but in inverted, horizontal and intermediate positions, we provide two opposed sumps S and S' that are spaced apart axially of the pot, and a lateral sump $S^2$. The sump S is confined to the circular end wall of the section 47 of the burner pot, and the sump S' is defined by a basin 50 that is supported in opposed relation to the aforesaid wall by a post 51 that is fastened at its rear end to said wall by a screw 52, and to the forward end of which post the basin 50 is secured. The lateral sump $S^2$ extends along an imperforate portion of the side wall of the pot, between the end wall of the section 47 and a dam 53 that is welded to the peripheral wall of the section 46 and is shown as generally crescent shaped (Fig. 5) with its upper edge defining a broad, shallow V notch so as to permit some rocking of the heater about its axis without overflow of the sump. It might be well to explain at this point that during operation of the burner, excepting at the time of starting, there is no appreciable amount of free liquid fuel in the pot.

A cylindrical, tubular wick support 55 is located centrally of the burner pot and is welded to and extends axially from the circular end wall of the section 47. The support is formed with a circumferential fuel distributing groove 56 that has an offset 57 to which the fuel delivered through a fuel feed tube 58 that leads in through the peripheral wall of the pot adjacent the upper rear portion thereof, as the parts are viewed in Fig. 2. A fuel supply pipe 59 is connected to the upper end of the feed tube. A tubular wick 60 of suitable materials surrounds and is sustained by the support 55, the wick being shown as of double thickness adjacent its rear end where it surrounds the fuel distributing groove 56, this being accomplished in the present instance by turning the wick back upon itself.

Figure 6:
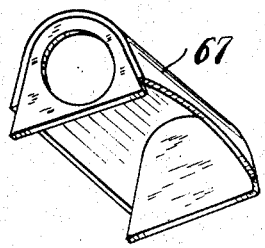
Fig. 6 is a perspective view of the igniter shield.
Figure 7:
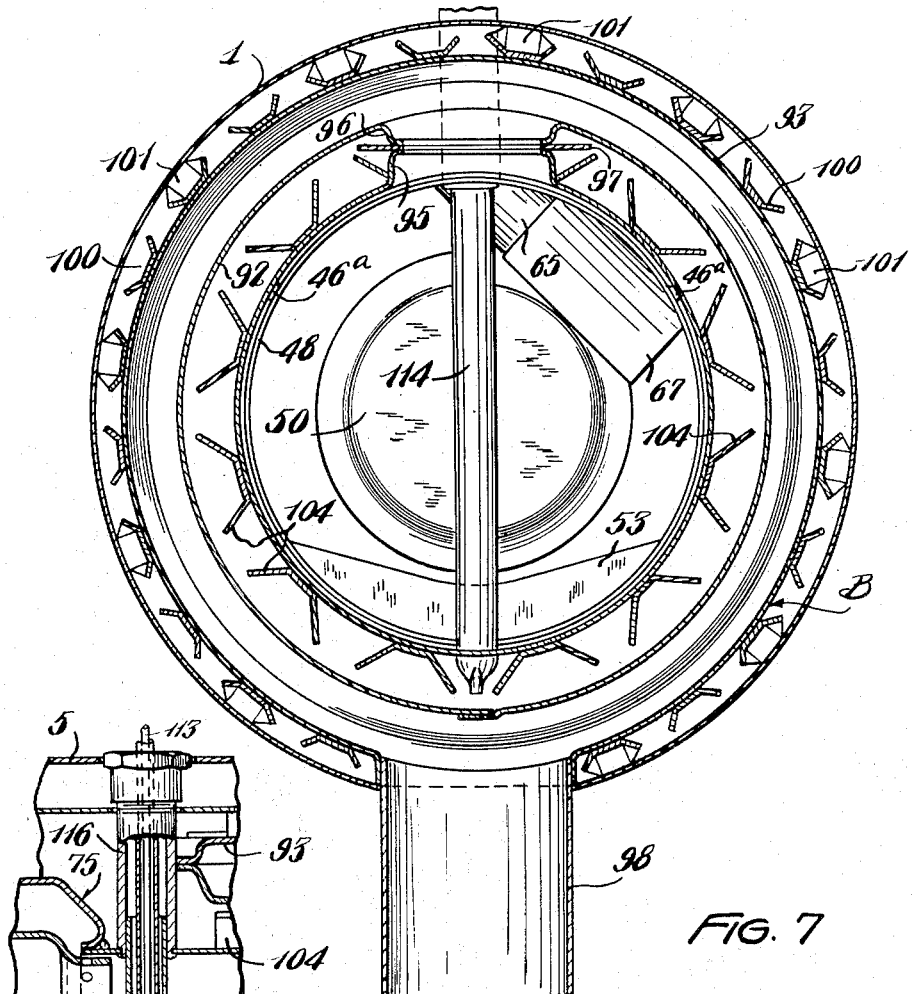
Fig. 7 is a transverse section on the line 7—7 of Fig. 2.

An electrical igniter, designated generally by the reference numeral 65, and which is desirably of the resistance or hot wire type, extends inwardly through an aperture in the side wall of the burner pot adjacent the fuel feed tube 58 and is disposed substantially tangent to the wick support. The resistance coil 66 of the igniter is in close proximity to the wick and within an igniter shield 67, shown in detail in Fig. 6, and which is suitably attached to an adjacent part of the burner pot.

The combustion chamber C is defined by a cylindrical wall 70, and a slightly dished circular end wall 71. The rear end of the wall 70 surrounds the neck 48 of the burner pot in slightly spaced relation thereto and bears against the spaced seats 46a. By reason of this construction and arrangement of the parts, a narrow annular slot is provided between the inner end of the wall 70 and the portion of the pot adjacent to and including the neck 48, this being for a purpose presently to appear.

Figure 3:
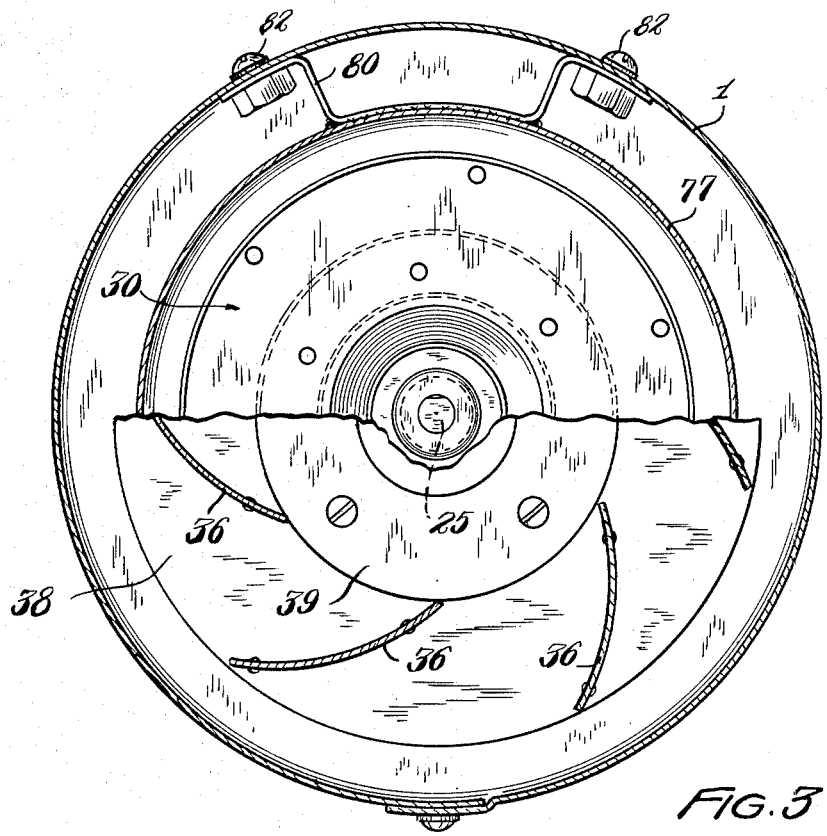
Fig. 3 is a transverse section on the line 3—3 of Fig. 2, drawn to a scale twice that of Fig. 2.
Figure 4:
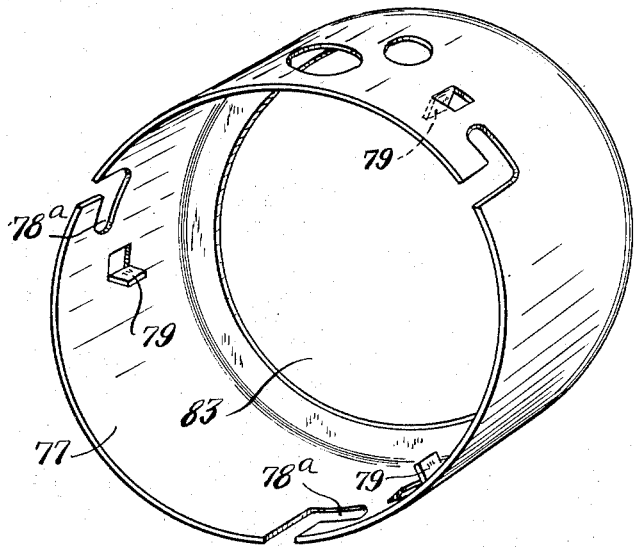
Fig. 4 is a perspective view of the rear part or section of the air housing.

An air housing, generally denoted 75, surrounds the burner pot and is radially spaced therefrom a substantial distance. This housing is made up of separable front and rear sections 76 and 77, respectively, each being cylindrical throughout the major portion of its length and the front section being sufficiently larger in diameter to readily telescope over the rear section. The sections are detachably connected together, in the present instance, by a bayonet joint provided by inwardly projecting studs 78 on the section 76, and by L slots 78a in the section 77 (Fig. 4). Radial lugs 79 are struck inwardly from the cylindrical wall of the section 77 and the ends of these lugs are welded to the burner pot 45, thereby positioning and supporting the latter. The forward end of the front section 75 is frusto-conical and its edge is curled inwardly and is welded to the wall 70 of the combustion chamber. Brackets 80 are welded to the top and bottom of the rear section 77, each bracket being generally U-shaped (Figs. 2 and 3), and its ends are turned outwardly and apertured for connection, by bolts 82, to the wall of the casing 1. The rear end of the peripheral wall of the housing section 77 turns inwardly about an opening 83 that is of slightly greater diameter than the combustion air fan 30. Accordingly said fan may be projected through said opening into the air housing when the air impeller unit A is attached to the rear of the casing 1. The said assembly A is fastened to the casing 1 by a suitable number of bolts 85, three in the present construction. These bolts are desirably used for a second purpose, to-wit that of attaching mounting means to the exterior of the casing 1, as will hereinafter more fully appear.

90 designates, generally, a heat exchanger that occupies the front portion of the casing 1 and consists of a hollow annular body. Said body is spaced a suitable distance from the casing and surrounds the combustion chamber in outwardly spaced relation to the cylindrical wall 70. The body of the heat exchanger is made up of inner and outer cylindrical walls 92 and 93 that are brought together at their ends and welded. The space enclosed by the walls 92 and 93 is placed in communication with the combustion chamber C by a suitable number of connections adjacent the forward end of the combustion unit assembly B. In the present instance, there are three such connections, and each is formed by bosses 95 and 96 that are struck from the respective walls 70 and 92. The ends of the bosses are flanged inwardly about relatively large openings that register with an opening of similar size in a plate 97 that is interposed between the ends of the bosses and to which the bosses are welded. The plates 97 facilitate welding, and also act as fins for better heat exchange. A tubular outlet extension 98 is joined to the wall 93 of the exchanger body about an opening therein. The extension is shown as located on the underside of the heat exchanger near the rear end thereof, and it is accommodated by an opening in the casing 1, produced by notches in the overlapped edge portions of the piece of sheet metal from which the casing 1 is formed.

Fins 100 of trough or channel formation are welded to the outer wall 93 of the heat exchanger in parallel relation to one another, and excepting at the bottom, where they are shortened because of the presence of the outlet extension 98 and the fastening means adjacent thereto, said fins extend nearly the full length of said wall. The flanges at the alternate ends of successive fins are brought together somewhat so as to dispose them in substantially radial relation to the cylindrical wall 93, as indicated at 101. These radial portions contact the wall of the casing 1 and serve to space the body of the heat exchanger a definite distance from said wall, and because of the restricted area of contact between said flanges and the casing wall, very little heat is dissipated through said wall. Fins 104, that are similar to but larger than the fins 100, are attached, as by welding, to the cylindrical wall 70 of the combustion chamber. These fins are substantially as long as the combustion chamber except where interrupted by the above described connections between the combustion chamber and the heat exchanger body.

Figure 8:
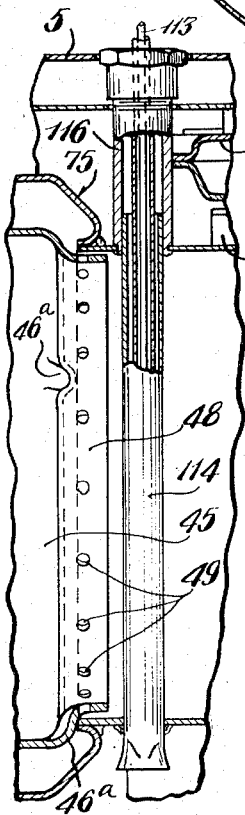
Fig. 8 is a detail of the thermostat protective tube, partly in section.

We have hereinbefore referred to electrical control systems that are sometimes associated with heaters of the class to which this invention particularly relates, and while a system of this character forms no part of the present invention, the invention, on the other hand, does comprehend the idea of providing supporting and protective means for the components of such a system, and of making said means a part of the overall structure. Therefore, we secure to the casing 1, by screws 105, a base 106 whereon various elements of the electrical control system are mounted. Said elements are enclosed and protected by a cover 108 that is removably connected to a part 109 rising from the base 106, by fastening means 110. Included in the control system is a so-called micro switch 112. This switch is actuated by a rod-like thermostat 113 (Fig. 8), encased within a protective tube 114 that extends diametrically through the combustion chamber C immediately adjacent the neck of the burner pot 45, and is shown as pinched together and thus closed at its lower end. The tube 114 is desirably welded adjacent its closed end to the wall 70 of the combustion chamber, and at its upper end is received by a tubular fitting 116 which has its lower end reduced and extended through an aperture in the wall of the combustion chamber and peened over on the inner side of said wall. Thus, the thermostat 113 is protected from the intense heat and deteriorating effect of the flame and, at the same time, against injury that might be caused by vibration.

Contracted about the forward end of the casing, by means of a bolt 122, is a band 123 to which an attachment fitting 125 is clamped, and a somewhat similar band 126 is engaged part way about the rear end of the casing and is held thereto by the previously mentioned bolts 85. An attachment fitting 127 is connected to the band 126, and through the medium of the attachment fittings 125 and 127, the heater may be connected to an appropriate part of a conveyance.

In considering the operation of the heater, it may be assumed that the control system functions to cause fuel to be fed through the pipe 59 and tube 58 to the trough 56 of the wick support 55. The fuel will immediately spread throughout the area of the wick, due to capillary action, and any free fuel will gravitate to the sump $S^2$, provided that the heater is in substantially the position illustrated in the drawings—that is, in a horizontal position. If the heater were in an upright vertical position, fuel would gravitate to the sump S, or if in inverted position, to the sump S'. The system will also cause the igniter 65 to be energized, and the heat from the coil 66 thereof will vaporize fuel from the wick and ignite it in the presence of air admitted through the openings 49 of the burner pot, it being understood that the fans 30 and 35 are also in operation, due to energization of the motor 15 at the proper time. Combustion will speedily advance and consume approximately all of the free fuel, and from this stage on the fuel will be burned about as fast as it is fed to the burner. Under the action of the fans, air is drawn through the opening 10 and about the motor 15 and on through the opening 26. Due to the relative sizes of the fans, the greater portion of the air is impelled through the so-called fresh air passage comprising the space occupied by the fan 35, and that enclosed by the casing 1 about the combustion unit assembly B and between the combustion chamber and the heat exchanger body. The air is highly heated as it sweeps over the exposed surfaces of the combustion unit assembly B and along the fins 100 and 104 thereof, and it may be conducted to any part of the conveyance that is to be heated thereby (as, for example, the personnel compartment) by conduit means (not shown) having communicative connection with the outlet end of the casing. The combustion air is impelled by the fan 30 through the combustion air passage made up of the space enclosed by the air housing 75 and that within the combustion chamber casing and the annular space enclosed by the hollow body of the heat exchanger. As the air progresses through the passage described and becomes a part of the products of combustion it is carried off through the outlet extension 98 of the heat exchanger. Through suitable conduits and connections, the products may be conveyed to the engine and other parts of the power plant to maintain them at proper operating temperatures, the heat derived from this source being used to preheat the engine and enhance starting in cold weather.

An appreciable part of the combustion air enters the combustion chamber C through the annular slot between the neck 48 of the burner pot and the surrounding portion of the wall 70 of the combustion chamber casing. Thus, an annular sheet of air is projected along the inner surface of said wall to protect the wall from the intense heat of the flame in the region of the discharge opening of the burner pot, and to better stabilize the process of combustion taking place in the combustion unit assembly B.

It is evident from the relative sizes of the fans 30 and 35, and from the fact that they are driven in unison, that the static pressure in the fresh air passage is supperior to that in the combustion air passage. Therefore, in the event that leakage accidentally occurs between the two passages, it will be in the direction of the combustion air passage and accordingly prevent contamination of the heated air delivered, for example, to the personnel compartment.

It is obvious from the construction described that access to the elements of the control system may readily be had by removing the cover 108; that the air impeller unit assembly A may be easily and quickly disconnected and removed for inspection, repair or replacement without disturbing any other part of the heater, and that, by disconnecting the fuel supply pipe 59, removing the igniter 65, and disconnecting the rear section of the air housing from the front section and from the heater casing, said rear section and the burner pot 45 may be withdrawn through the rear end of the casing 1.

Having thus described our invention, what we claim is:

1. A liquid fuel pot type burner comprising an imperforate end wall and a peripheral wall, the latter being provided with air admitting openings in substantially spaced relation to said end wall and spaced apart circumferentially of the peripheral wall, a cylindrical wick support projecting inwardly from the end wall substantially axially of the burner, said support having a circumferential fuel distributing groove spaced from said end wall, a fuel feed tube extending into the burner with its discharge end closely adjacent said groove and in a position to deliver fuel directly thereto, a tubular wick surrounding and sustained by said support and enclosing said groove, and an electrical igniter including a resistance wire, said igniter extending into the burner and arranged with the resistance wire in fuel vaporizing and igniting relation to the wick.

2. A liquid fuel burner of the pot type that is capable of use in an upright vertical position and in an inverted position; said burner comprising an end wall and a peripheral wall, the end wall providing a sump when the burner is used in an upright vertical position, a support secured to and extending inwardly from the end wall axially of the burner, a basin carried by and fixedly secured to said support in inverted relation to said first named sump and defining a second sump for use when the burner is in inverted position, and means for delivering liquid fuel to the burner adjacent the bottom wall between it and the aforesaid basin so that the liquid fuel will gravitate to and accumulate in one or the other of said sumps according to whether the burner is in upright or inverted position.

3. A liquid fuel burner of the pot type that is capable of use in an upright vertical position, in an inverted position, in a horizontal position, and in positions intermediate those mentioned; said burner comprising an end wall and a peripheral wall, the end wall providing a sump when the burner is used in an upright vertical position, a support secured to and extending inwardly from the end wall axially of the burner, a basin carried by said support in inverted relation to said first named sump and defining a second sump for use when the burner is in inverted position, a dam extending inwardly from the peripheral wall in substantially spaced relation to the end wall thereby to provide a lateral sump between said end wall and the dam for use when the burner is in a horizontal position, and means for delivering liquid fuel to the burner adjacent the bottom wall between it and the aforesaid basin so that the liquid fuel will gravitate to and accumulate in the lowermost sump when the burner is in one or another of the aforesaid upright, inverted or horizontal positions.

4. A liquid fuel pot type burner comprising a bowl including an imperforate end wall and a peripheral wall, the latter wall being provided with air admitting openings in substantially spaced relation to said end wall and spaced apart circumferentially of the peripheral wall, a cylindrical wick support extending inwardly from said end wall axially of the bowl, the same being provided with an external fuel receiving and distributing groove that extends about the support, means for feeding fuel to said groove, a wick surrounding and sustained by said support, a sump defining basin, means supporting the same substantially centrally of the bowl and in inverted relation thereto, said wick extending into said basin, and a dam extending inwardly from the peripheral wall of the bowl in substantially spaced relation to said end wall and between the latter wall and the perforations in the adjacent portion of the peripheral wall.

5. A liquid fuel burner according to claim 3, wherein the top edge of said dam is of a shape to define a broad shallow V notch.

References Cited in the file of this patent

UNITED STATES PATENTS

| | | |
|---|---|---|
| 493,947 | Scholding | Mar. 21, 1893 |
| 939,415 | Heindel | Nov. 9, 1909 |
| 1,379,179 | Good | May 24, 1921 |
| 1,396,166 | Dalcher | Nov. 8, 1921 |
| 1,938,348 | Neumann | Dec. 5, 1933 |
| 2,025,074 | Roe | Dec. 24, 1935 |
| 2,250,139 | Shimer | July 22, 1941 |
| 2,286,853 | Holthouse | June 16, 1942 |
| 2,386,746 | Hess | Oct. 9, 1945 |
| 2,440,447 | McCollum | Apr. 27, 1948 |
| 2,445,341 | Trimble et al. | July 20, 1948 |
| 2,475,024 | Hayter | July 5, 1949 |
| 2,488,548 | MacCracken | Nov. 22, 1949 |
| 2,498,362 | De Lancey | Feb. 21, 1950 |
| 2,509,399 | Resek | May 30, 1950 |
| 2,526,015 | Figg et al. | Oct. 17, 1950 |
| 2,538,745 | Breese | Jan. 23, 1951 |
| 2,579,507 | MacCracken | Dec. 25, 1951 |
| 2,581,999 | Blatz | Jan. 8, 1952 |
| 2,603,281 | Frankland | July 15, 1952 |
| 2,649,285 | Brown | Aug. 18, 1953 |
| 2,652,106 | Cleveland | Sept. 15, 1953 |
| 2,654,219 | Zaba | Oct. 6, 1953 |
| 2,710,652 | Ambrose | June 14, 1955 |